United States Patent [19]

Grisley

[11] Patent Number: 4,750,536
[45] Date of Patent: Jun. 14, 1988

[54] ROUTER VACUUM ATTACHMENT

[76] Inventor: Kenneth M. Grisley, P.O. Box 4646, Quesnel, British Columbia, Canada, V2J 3J8

[21] Appl. No.: 857,472

[22] Filed: Apr. 30, 1986

[51] Int. Cl.$^4$ .............................................. B27G 3/00
[52] U.S. Cl. ................................. 144/251 B; 51/273; 144/252 R; 409/137
[58] Field of Search ........................ 408/58, 67, 68, 87, 408/90; 409/137; 51/268, 270, 273; 83/100; 144/252 A, 252 R, 251 R, 251 A, 251 B, 134 D, 136 C; 407/100

[56] References Cited

U.S. PATENT DOCUMENTS

| | | | |
|---|---|---|---|
| 1,423,511 | 7/1922 | Baker | 409/137 |
| 1,552,553 | 9/1925 | Georgia | 144/252 R |
| 1,923,159 | 8/1933 | McLaren | 409/137 |
| 1,990,991 | 2/1935 | Heubach | 30/276 |
| 2,750,971 | 6/1956 | Collette et al. | 144/136 C X |
| 2,852,051 | 9/1958 | Bickner | 144/136 C |
| 3,022,806 | 2/1962 | Johnston | 144/252 R |
| 3,837,383 | 9/1974 | Ko | 409/137 |
| 4,051,880 | 10/1977 | Hestily | 144/252 R |
| 4,088,164 | 5/1978 | McCord, Jr. | 51/273 |
| 4,382,728 | 5/1983 | Anderson et al. | 409/137 |
| 4,409,699 | 10/1983 | Moorhouse | 51/273 |

FOREIGN PATENT DOCUMENTS

| | | | |
|---|---|---|---|
| 2925908 | 1/1981 | Fed. Rep. of Germany | 408/67 |
| 8401320 | 4/1984 | PCT Int'l Appl. | 409/137 |
| 916239 | 3/1982 | U.S.S.R. | 409/137 |

Primary Examiner—Z. R. Bilinsky
Attorney, Agent, or Firm—Fulwider, Patton, Rieber, Lee & Utecht

[57] ABSTRACT

A waste attachment for a router. A first housing is connected to a vacuum source and attached to a router base. A second housing is slidably attached to the first housing. An arm extends from the second housing and ends in an inlet to receive router waste. The arm is used when the waste attachment is in its useful position on a router, into contact with the work piece being routed.

5 Claims, 1 Drawing Sheet

ROUTER VACUUM ATTACHMENT

FIELD OF THE INVENTION

This invention relates to a waste attachment for a router. The invention is of particular application in portable hand-held routers.

DESCRIPTION OF THE PRIOR ART

Woodworking routers, as with the vast majority of woodworking tools, produce large amounts of waste during operation. Disposal of the waste, sawdust, chips and the like, can be difficult to carry out. The waste is a nuisance both on a workshop floor and, in particular, when the router is being used in an area other than a workshop where the production of dust is even less desirable.

There have been a number of proposals to remove the dust produced but, generally, these prior proposals have not met with widespread acceptance. Applicant's experience is that the prior proposals will not remove an adequate percentage of the chips or waste produced. Thus even though the waste device may be attached to the router an excessive quantity of waste is still distributed in the workplace.

Examples of the prior art known to applicant in the patent literature include U.S. Pat. Nos. 1,423,511 to Baker; 1,923,159 to McLaren; 1,990,991 to Heubach; 4,088,164 to McCord; 4,051,880 to Hestily; 3,022,806 to Johnston; and 4,409,699 to Moorhouse. Of the above patents Hestily discloses a dustless router using a dust chamber, a flexible conduit, an armature driven blower fan and a dustbag. Debris produced by the router is drawn up the conduit via the fan and deposited in the bag. McCord teaches a dual purpose portable router debris collector and adjustable depth guide. The device removes wood chips from the working material by means of a hole and an outlet opening formed in the base of a casing. Vacuum is applied.

Moorhouse discloses a power tool waste collector comprising a base, vacuum neck and means of retaining a slidable platform 18 in contact with the workpiece. This retaining is carried out by a tensioning spring suspended between two posts. Baker shows a routing tool with a rotor driven fan. The output of the fan is directed to the chuck by means of a nozzle and thus keeps the work area free of debris by blowing debris away. Johnston teaches a router dustguard comprising a one piece casing that is retained in place by the router handle and attached to vacuum means. McLaren teaches a wall crack cutting router provided with a fan and waste removal conduit and Heubach discloses an electrical wall cutter similar to that of McLaren that also employs debris collection means.

SUMMARY OF THE INVENTION

The present invention seeks to produce a waste attachment for a router that is compact, easy to use, does not interfere with the operation of the router to any appreciable extent and has a very high percentage of waste collection, typically at least 90%.

Accordingly the present invention is a waste attachment for a router including a router cutter comprising a first housing adapted to be connected to a vacuum source; means to attach the first housing to a router base; a second housing rotatably attached to the first housing; an arm extending from the second housing and ending in an inlet to receive router waste; and resilient means urging the arm, when the waste attachment is in its useful position on a router, into contact with the work piece being routed, ahead of the rotating router cutter.

DRAWINGS

Aspects of the invention are illustrated, merely by way of example, in the accompanying drawings in which.

DESCRIPTION OF THE PREFERRED EMBODIMENTS

Figure 1:
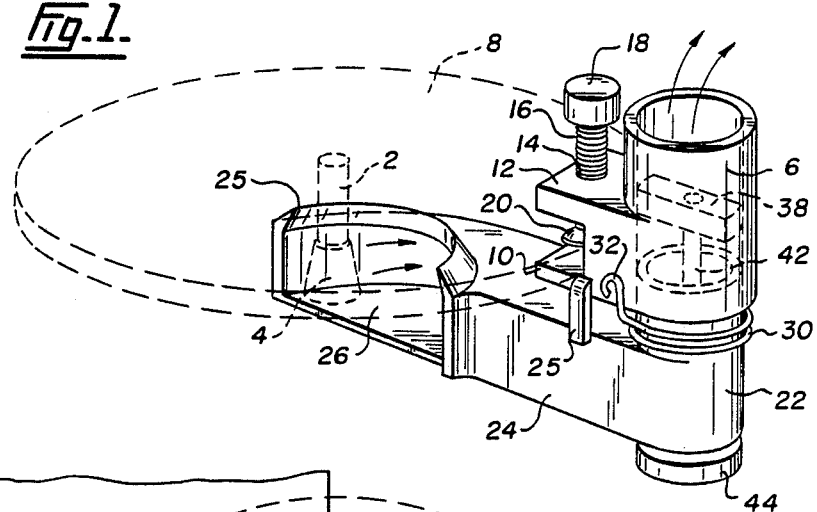
FIG. 1 is a perspective view of the waste attachment according to the present invention.

The drawings show a waste attachment for a router, only the shaft 2 and cutter 4 of the router being shown. The attachment has a first housing 6 that is adapted to be connected to a vacuum source, such as a central vacuum source in a workshop or a pipe connected to a conventional vacuum cleaner. There are means to attach to the first housing 6 to a router base 8. In the illustrated embodiment the means comprises arms 10 and 12 extending from the first housing 6. The arms 10 and 12 are spaced apart so that one can be positioned above and one below the router base 8, shown in broken lines in FIGS. 1 and 2 but in solid lines in FIG. 3. The upper arm 12 has a threaded opening 14 to receive threaded column 16. The threaded column 16 is provided with a knob 18 at one end, so that it may be turned, and with a pivotally mounted clamping member 20 at its other end. By tightening the clamping member 20, typically by rotating the knob 18 clockwise, the clamping member 20 grips the router base 8 between the lower arm 10 and the member's lower surface.

There is a second housing 22 rotatably attached to the first housing 6. The arrangement is most clearly shown in FIG. 3. The second housing 22 has an arm 24 extending from it and ending in an inlet 26, positioned generally at a workpiece 28 shown in FIG. 2. The arm 24 contacts the work piece 28 at a point ahead of the cutter 4. Arm 24 is provided with a raised lip 25 to contact router base 8 to provide a seal. Lip 25 is raised over arm 24 by an amount at least equal to the thickness of arm 10. The interior face of lip 25 is inclined as shown most clearly in FIG. 3, to direct debris downwardly.

There are resilient means in the form of a coil spring 30 urging the arm 24 to contact the workpiece 28 being routed. The coil spring 30 is coiled around the second housing 22, as shown in FIG. 3, with one end 32 extending upwardly to contact the first housing, as shown particularly in FIG. 1. The other end 34 of the spring 30, extends downwardly to contact the arm 24, as shown in broken lines in FIG. 3. Stop 25 prevents arm 24 contacting the cutter 4. Stop 25 is attached to the first housing 6 and extends to contact the arm 24 to restrict the movement of arm 24 - see the broken line position in FIG. 2.

The second housing 22 is rotatably and telescopically mounted relative to the first housing 6 by the provision of a threaded column 36 within the first housing 6 extending downwardly from a cross piece 38 located on the inside of the first housing. There is a column 40 with clear opening in the second housing 22.

A threaded member 42 extends through column 40 to engage the threaded column 36. The threaded member 42 has head 44 to facilitate turning. A washer 46 may be provided between head 44 and housing 22. A spring 47 is located between the columns 36 and 40 to push housing 22 downwardly into contact with head 44 to provide precise vertical adjustment of arm 24.

The above arrangement, particularly the telescoping fit of the housings 6 and 22 under the control of spring 47, acting with columns 36 and 40, ensures a sweep of the arm 24 that is always parallel to router base 8, which is the preferred path for maximum effect.

The attachment according to the present invention is used as follows:

Knob 18 is turned to retract clamping member 20 and the attachment is then located on the base 8 of a router. Knob 18 is tightened. Depending on the type of work, jig or edge rout, head 44 is rotated to fix the depth of insertion of second housing 22 into the first housing 6 and thus the position of the arm 24 beneath the router base 8. A vacuum hose is connected to the first housing 6 by conventional means, for example a simple push-fit is usually sufficient. The vacuum source is activated and the router is then ready for use in conventional manner. During use the arm 24 engages the edge of the workpiece, ahead of the router cutter, in the manner shown in FIG. 2 because of the presence of coil spring 30. Chips and any waste such as sawdust generated by the router are fed tangentially into the inlet 26 as shown by the arrows in FIG. 2, through the first and second housings and into a collecting place for the waste. Such a collection place will typically be an air permeable bag.

It should be noted that the waste attachment may be made as a mirror image of the illustrated embodiment for the minority of routers that turn anti-clockwise.

Using the illustrated embodiment of the invention collection rates of 90% and more have been attained.

The attachment of the present invention is for portable hand-held routers. It has universal attachment means, that is it may be attached to any known hand-held router base and the attachment means is such that the router base and the arm 24 are always maintained parallel to each other. This is a function of the relative positions of the arms 10 and 12, particularly 10 which fits flush on router base underside, the relative mounting of the first and second housings 6 and 22 and the threaded column 42 extending to clear column 40 in second housing 22 to engage threaded column 36 in the first housing 6. Because of spring 30 the leading edge of the arm 24, that is by the inlet 26, is always maintained in contact with the workpiece.

The waste attachment of the invention is suitable for edge routing with pilot bearing profile cutters or with a limited horizontal depth template routing using a template guide bush. Because arm 24 is adjustable vertically, by operation of the threaded column 42, the attachment may be used on projecting templates of differing thicknesses.

Figure 2:
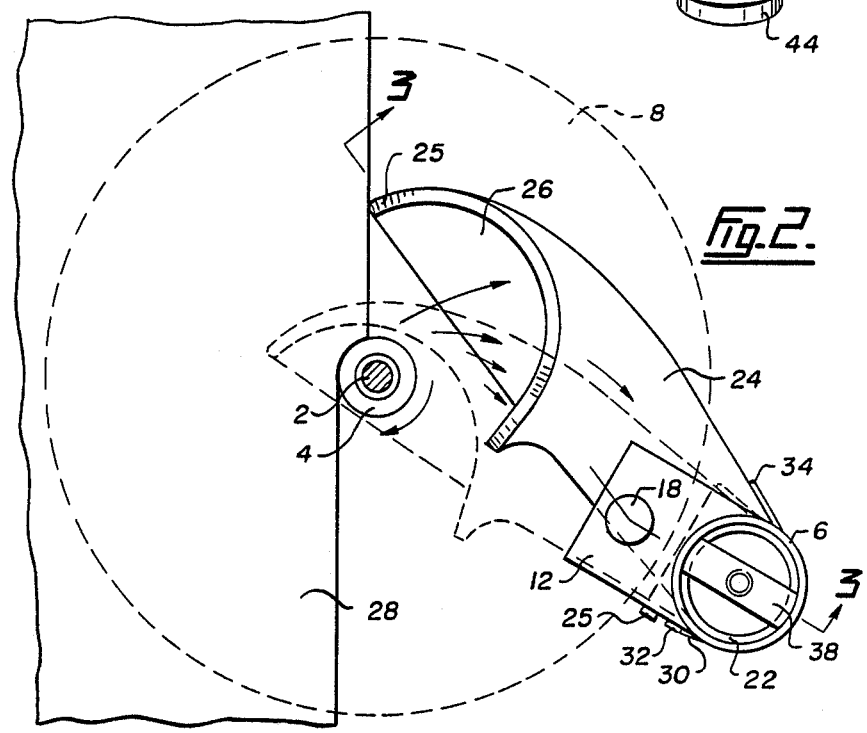
FIG. 2 is a plan view of the attachment when the device is in use on a workpiece.
Figure 3:
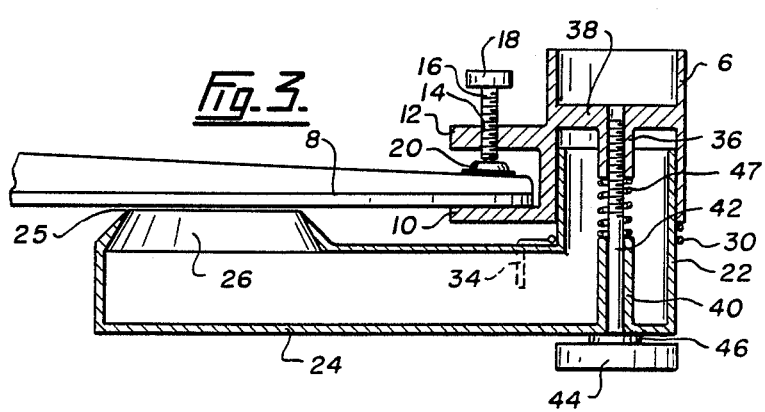
FIG. 3 is a section on the line 3—3 in FIG. 2.

As noted particularly in FIGS. 1 and 2 the inlet 26 of the arm 24 is cut away on a radius on its upper surface. This allows for large diameter wing profile cutters which are now common on hand-held routers.

The attachment of the present invention may be simply made, for example of plastic or of lightweight metal.

I claim:

1. A waste attachment for an edge router comprising:
    a first housing adapted to be connected to a vacuum source;
    means to attach the first housing to a router base;
    a second housing rotatably and telescopically attached to the first housing;
    means to control the extent of telescoping of the first and second housings;
    a pivotable arm extending from the second housing to move with the second housing, the arm ending in an inlet to receive router waste; and
    resilient means to urge the pivotable arm, when the waste attachment is in use on a router, into contact with the edge of a work piece being routed such that the arm inlet is positioned adjacent the router bit so that the inlet intercepts the tangential waste flow from the router bit.

2. An attachment as claimed in claim 1 in which the means to attach the first housing to a router base comprises arms extending from the first housing, one to be positioned on each side of the router base; and
    clamping means threadedly received in one arm to be moved into contact with the router base to clamp the base against the other arm.

3. An attachment as claimed in claim 1 in which the attachment of the second housing to the first housing is by a threaded opening within the first housing;
    an unthreaded opening in the second housing;
    a threaded member extending through the unthreaded opening to engage the threaded openings whereby rotation of the threaded member into the threaded opening exerts a force on the second housing causing the second housing to telescope relative to the first housing about the axis of the threaded member.

4. An attachment as claimed in claim 1 in which the arm extending from the second housing and ending in an inlet to recieve router waste has a widened inlet to permit use with varying diameter router cutters.

5. An attachment as claimed in claim 1 which the resilient means is a coil spring having a first end received on the second housing and a second end in contact with the first housing.

* * * * *